US008964356B2

(12) United States Patent
Suzuki et al.

(10) Patent No.: US 8,964,356 B2
(45) Date of Patent: Feb. 24, 2015

(54) DIELECTRIC CERAMIC AND LAMINATED CERAMIC CAPACITOR

(75) Inventors: Shoichiro Suzuki, Nagaokakyo (JP); Toshikazu Takeda, Nagaokakyo (JP); Jun Ikeda, Nagaokakyo (JP); Megumi Morita, Nagaokakyo (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 345 days.

(21) Appl. No.: 13/418,898

(22) Filed: Mar. 13, 2012

(65) Prior Publication Data

US 2012/0170169 A1 Jul. 5, 2012

Related U.S. Application Data

(63) Continuation of application No. PCT/JP2010/064061, filed on Aug. 20, 2010.

(30) Foreign Application Priority Data

Sep. 28, 2009 (JP) ................................ 2009-221800

(51) Int. Cl.

| | |
|---|---|
| ***H01B 3/12*** | (2006.01) |
| ***C04B 35/46*** | (2006.01) |
| ***H01G 4/12*** | (2006.01) |
| ***H01G 4/30*** | (2006.01) |
| ***C04B 35/468*** | (2006.01) |

(52) U.S. Cl.

CPC .............. *C04B 35/4682* (2013.01); *H01B 3/12* (2013.01); *H01G 4/1227* (2013.01); *H01G 4/30* (2013.01); *C04B 2235/3206* (2013.01); *C04B 2235/3208* (2013.01); *C04B 2235/3225* (2013.01); *C04B 2235/3236* (2013.01);

(58) Field of Classification Search

USPC .......................... 361/311, 320, 321.1–321.5; 501/137–139

See application file for complete search history.

(56) References Cited

U.S. PATENT DOCUMENTS

| | | | | |
|---|---|---|---|---|
| 6,544,916 | B1 | 4/2003 | Sato et al. | |
| 6,917,513 | B1 * | 7/2005 | Kim et al. | 361/321.2 |
| 7,273,825 | B2 | 9/2007 | Muto et al. | |
| 7,358,208 | B2 | 4/2008 | Ito et al. | |

FOREIGN PATENT DOCUMENTS

| | | | | |
|---|---|---|---|---|
| CN | 101006027 | A | 7/2007 | |
| CN | 101027264 | A | 8/2007 | |
| JP | H09-183651 | A | 7/1997 | |
| JP | 2001031469 | * | 7/1999 | C04B 35/46 |

(Continued)

OTHER PUBLICATIONS

Japanese Office Action issued for counterpart Japanese Application No. 2011-532942, dispatch date Jan. 7, 2014.
Intenational Search Report, mailed Nov. 22, 2010.

*Primary Examiner* — Jenny L Wagner
*Assistant Examiner* — Michael E Moats, Jr.
(74) *Attorney, Agent, or Firm* — Dickstein Shapiro LLP

(57) ABSTRACT

A dielectric ceramic which is suitable for use in a laminated ceramic capacitor under a high-temperature environment, such as encountered in, for example, automobile use has a composition represented by the composition formula: $(1-x)(Ba_{1-y}Ca_y)_mTiO_3+xCaTiO_3+aRe_2O_3+bMgO+cMnO+dV_2O_3+eSiO_2$ in which Re is Gd, Dy, Y, Ho, and/or Er), $0.001 \le x \le 0.02$, $0.08 \le y \le 0.20$, $0.99 \le m \le 1.05$, $0.01 \le a \le 0.04$, $0.005 \le b \le 0.035$, $0 \le c \le 0.01$, $0 \le d \le 0.01$, $0.01 \le e \le 0.04$ when a, b, c, d, and e are each expressed in terms of parts by mol with respect to 1 mol of $(1-x)(Ba,Ca)TiO_3+xCaTiO_3$. This dielectric ceramic can constitute the dielectric ceramic layers of a laminated ceramic capacitor.

16 Claims, 1 Drawing Sheet

(52) U.S. Cl.
CPC .................. *C04B 2235/3239* (2013.01); *C04B 2235/3262* (2013.01); *C04B 2235/3418* (2013.01); *C04B 2235/656* (2013.01); *C04B 2235/6582* (2013.01); *C04B 2235/6584* (2013.01); *C04B 2235/6588* (2013.01); *C04B 2235/79* (2013.01)
USPC .................. 361/321.4; 361/321.1; 361/321.2; 361/321.3; 361/321.5

(56) References Cited

FOREIGN PATENT DOCUMENTS

| | | | |
|---|---|---|---|
| JP | 2001031469 | A | 2/2001 |
| JP | 2001220225 | A | 8/2001 |
| JP | 2006199534 | A | 8/2006 |

* cited by examiner

DIELECTRIC CERAMIC AND LAMINATED CERAMIC CAPACITOR

This is a continuation of application Ser. No. PCT/JP2010/064061, filed Aug. 20, 2010, the entire contents of which is hereby incorporated herein by reference.

TECHNICAL FIELD

This invention relates to a dielectric ceramic and a laminated ceramic capacitor, and more particularly, relates to a dielectric ceramic which is suitable for use in a laminated ceramic capacitor intended to be used in a high-temperature environment, such as, for example, for automobile use, and a laminated ceramic capacitor configured with the use of the dielectric ceramic.

BACKGROUND ART

For laminated ceramic capacitors intended for uses such as in automobiles, performance guarantees at higher temperature ranges may be required in some cases, as compared with normal laminated ceramic capacitors. For example, the X8R characteristic of the EIA standard (the rate of change in electrostatic capacitance within ±15% with 25° C. as a standard at −55° C. to 125° C.), etc. are required for the laminated ceramic capacitors.

When this guarantee is desired, a $(Ba,Ca)TiO_3$ based material as described in, for example, Japanese Patent Application Laid-Open No. 2006-199534 (Patent Document 1) has been used as a main constituent of the dielectric ceramic constituting dielectric ceramic layers included in a laminated ceramic capacitor.

However, the dielectric ceramic described in Patent Document 1 has a problem that a decrease in insulation resistivity is likely to occur. In addition, the dielectric ceramic has a problem in that it is difficult to achieve a balance between the insulation resistivity and the dielectric constant, because the increased insulation resistivity decreases the dielectric constant.

PRIOR ART DOCUMENTS

Patent Document 1: Japanese Patent Application Laid-Open No. 2006-199534

DISCLOSURE OF THE INVENTION

Problem to be Solved by the Invention

Therefore, an object of this invention is to provide a dielectric ceramic which can solve the problems described above, and more specifically, a dielectric ceramic which is suitable for use in a laminated ceramic capacitor to be used under in high-temperature environment such as, for example, for automobile use.

Another object of this invention is to provide a laminated ceramic capacitor configured with the use of the dielectric ceramic mentioned above.

Means for Solving the Problem

In order to solve the technical problems described above, a dielectric ceramic according to this invention characteristically has a composition represented by the composition formula:$(1-x)\ (Ba_{1-y}Ca_y)TiO_3+xCaTiO_3+eSiO_2$, and satisfies the respective conditions of $0.001 \leq x \leq 0.02$ and $0.08 \leq y \leq 0.20$, and satisfies a condition of $0.01 \leq e \leq 0.04$ when e is expressed in terms of parts by mol with respect to 1 mol of $(1-x)(Ba_{1-y}Ca_y)TiO_3+xCaTiO_3$.

The dielectric ceramic according to this invention characteristically has, in a preferred embodiment, a composition represented by the composition formula: $(1-x)\ (Ba_{1-y}Ca_y)_m TiO_3+xCaTiO_3+aRe_2O_3+bMgO+cMnO+dV_2O_3+eSiO_2$ (where Re is at least one element selected from Gd, Dy, Y, Ho, and Er), and satisfying the respective conditions of $0.001 \leq x \leq 0.02$, $0.08 \leq y \leq 0.20$, and $0.99 \leq m \leq 1.05$, and satisfying respective conditions of $0.01 \leq a \leq 0.04$, $0.005 \leq b \leq 0.035$, $0 \leq c \leq 0.01$, $0 \leq d \leq 0.01$, and $0.01 \leq e \leq 0.04$ when a, b, c, d, and e are each expressed in terms of parts by mol with respect to 1 mol of $(1-x)(Ba_{1-y}Ca_y)_m TiO_3+xCaTiO_3$.

In the dielectric ceramic according to this invention, the $CaTiO_3$ is mainly present independently from $(Ba,Ca)TiO_3$ main phase grains, and secondary phase grains, grain boundaries, triple points, etc., are conceivable for the existence form of the $CaTiO_3$, which is not to be considered limited particularly.

The invention is also directed to a laminated ceramic capacitor including a capacitor main body comprising a plurality of stacked dielectric ceramic layers and a plurality of internal electrodes formed along specific interfaces between the dielectric ceramic layers, and a plurality of external electrodes formed in different positions from each other on an outer surface of the capacitor main body and electrically connected to specific ones of the internal electrodes. The laminated ceramic capacitor according to this invention is characterized in that the dielectric ceramic layers comprise the above-described dielectric ceramic according to this invention.

Effect of the Invention

The dielectric ceramic according to this invention has high reliability at high temperatures, and has $CaTiO_3$ added in a predetermined range, and thus can achieve a dielectric constant of 1000 or more while increasing the insulation resistivity to 10 or more in terms of log ρ (in "Ω·m" units for ρ). This value is a striking value in the material composition for guarantee at high temperatures with the large Ca substitution amount (y) of 0.08 or more. This is presumed to be because the addition of a predetermined amount, although minute, of $CaTiO_3$ stabilizes the Ca concentration at crystal grain boundaries, and suppresses the movement of the Ca component between $(Ba,Ca)TiO_3$ grains as main phase grains, thereby reducing the variation in Ca concentration between the grains.

The preferred embodiment of this invention can achieve a dielectric ceramic which further satisfies the X8R characteristic of the EIA standard, and has increased high-temperature load reliability of 20 hours or more in Mean Time To Failure in the case of the application of a direct-current voltage with an electric field intensity of 30 □V/mm at 175° C.

Therefore, excellent high-temperature load reliability can be ensured by applying the dielectric ceramic according to this invention to a laminated ceramic capacitor. Accordingly, a laminated ceramic capacitor suitable for automobile use can be made.

BEST MODE FOR CARRYING OUT THE INVENTION

Figure 1:
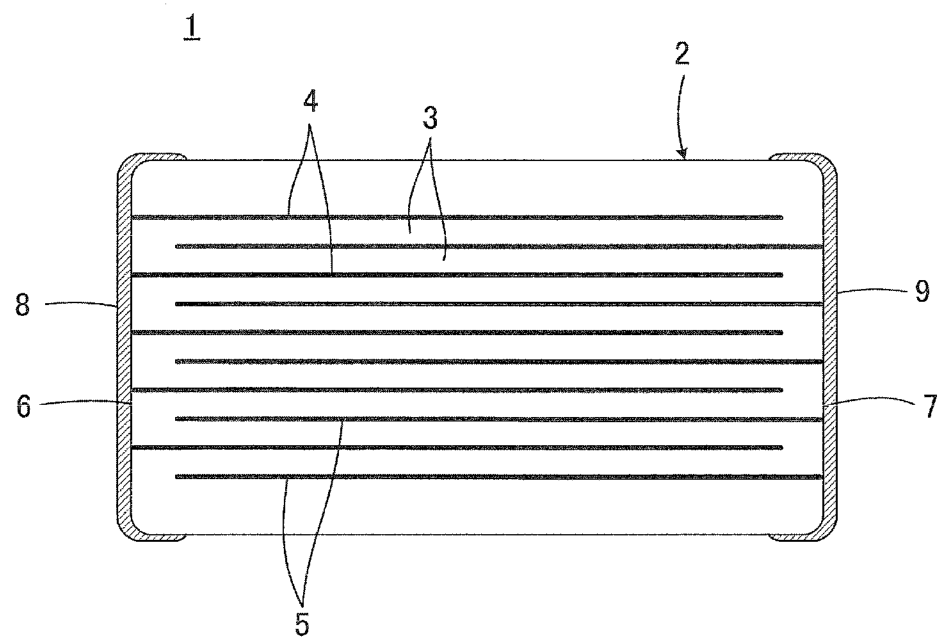
FIG. 1 is a cross-sectional view schematically illustrating a laminated ceramic capacitor 1 configured with the use of a dielectric ceramic according to this invention.

FIG. 1 is a cross-sectional view schematically illustrating a laminated ceramic capacitor 1 configured with the use of a dielectric ceramic according to this invention.

The laminated ceramic capacitor 1 includes a capacitor main body 2. The capacitor main body 2 is composed of a plurality of dielectric ceramic layers 3 stacked, and a plurality of internal electrodes 4 and 5 respectively formed along a plurality of specific interfaces between the plurality of dielectric ceramic layers 3. The internal electrodes 4 and 5 are formed to reach the outer surface of the capacitor main body 2, with the internal electrodes 4 being extracted to one end surface 6 of the capacitor main body 2 and the internal electrodes 5 being extracted to the other end surface 7 thereof and arranged alternately in the capacitor main body 2.

On the outer surface of the capacitor main body 2, external electrodes 8 and 9 are formed on end surfaces 6 and 7 so as to be electrically connected to the internal electrodes 4 and 5, respectively. As the material for these external electrodes 8 and 9, Ni, Ni alloys, Cu, Cu alloys, Ag, or Ag alloys, etc. can be used. The external electrodes 8 and 9 are typically formed in such a way that a conductive paste obtained with the addition of glass frit to a metal powder is applied onto the both end surfaces 6 and 7 of the capacitor main body 2, and subjected to firing.

In addition, if necessary, a first plating film composed of Ni, Cu, or the like, is formed on the external electrodes 8 and 9, and a second plating film composed of solder, Sn, or the like is further formed thereon.

In this laminated ceramic capacitor 1, the dielectric ceramic layers 3 are composed of a dielectric ceramic which has a composition represented by the composition formula: $(1-x)(Ba_{1-y}Ca_y)TiO_3+xCaTiO_3+eSiO_2$. In the composition formula, the conditions of $0.001 \le x \le 0.02$ and $0.08 \le y \le 0.20$ are satisfied, and the condition of $0.01 \le e \le 0.04$ is satisfied when e is expressed in terms of parts by mol with respect to 1 mol of $(1-x)(Ba_{1-y}Ca_y)TiO_3+xCaTiO_3$.

The dielectric ceramic has $CaTiO_3$ present in a predetermined range, and thus can achieve a dielectric constant of 1000 or more while increasing the insulation resistivity to 10 or more in terms of log ρ (with "Ω·m" being the unit of ρ). This is presumed to be because the addition of a predetermined amount of $CaTiO_3$ stabilizes the Ca concentration at crystal grain boundaries, and suppresses the movement of the Ca component between $(Ba,Ca)TiO_3$ main phase grains, thereby reducing the variation in Ca concentration between the grains.

In the case of preparing the laminated ceramic capacitor 1 with the use of the dielectric ceramic as in this embodiment, the addition of appropriate amounts of elements such as Mn, V, Re (Re being at least one of Gd, Dy, Y, Ho, and Er) can improve characteristics such as temperature characteristics and reliability characteristics.

More specifically, the dielectric ceramic layers 3 described above are preferably composed of a dielectric ceramic which has a composition represented by the composition formula: $(1-x)(Ba_{1-y}Ca_y)_mTiO_3+xCaTiO_3+aRe_2O_3+bMgO+cMnO+dV_2O_3+eSiO_2$ (where Re is at least one of Gd, Dy, Y, Ho, and Er). In this composition formula, the respective conditions of $0.001 \le x \le 0.02$, $0.08 \le y \le 0.20$, and $0.99 \le m \le 1.05$ are satisfied, and the respective conditions of $0.01 \le a \le 0.04$, $0.005 \le b \le 0.035$, $0 \le c \le 0.01$, $0 \le d \le 0.01$, and $0.01 \le e \le 0.04$ are satisfied when a, b, c, d, and e are each expressed in terms of parts by mol with respect to 1 mol of $(1-x)(Ba_{1-y}Ca_y)_mTiO_3+xCaTiO_3$.

The dielectric ceramic which has the composition mentioned above further satisfies the X8R characteristic of the EIA standard, and can increase the high-temperature load reliability to 20 hours or more in Mean Time To Failure in the case of the application of a direct-current voltage with an electric field intensity of 30 □V/mm at 175° C.

Therefore, excellent high-temperature load reliability can be ensured in the laminated ceramic capacitor 1.

It is to be noted that while the laminated ceramic capacitor 1 shown is a two-terminal type capacitor including the two external electrodes 8 and 9, this invention can be also applied to multi-terminal type laminated ceramic capacitors.

Next, Experimental Examples will be described below which were carried out for confirming the effects of this invention.

EXPERIMENTAL EXAMPLE 1

$(Ba_{1-y}Ca_y)TiO_3$ adjusted in Ca substitution amount to the "y" shown in Table 1, $CaTiO_3$, MnO, and $SiO_2$ were prepared, and these materials were weighed so that "x", "c", and "e" achieved the numerical values shown in Table 1 in the composition formula of$(1-x)$ $(Ba_{1-y}Ca_y)TiO_3+xCaTiO_3+cMnO+eSiO_2$ to prepare a mixed raw material powder. In this case, "c" and "e" represent parts by mol with respect to 1 mol of $(1-x)$ $(Ba_{1-y}Ca_y)TiO_3+xCaTiO_3$.

Next, this raw material powder combined with a polyvinyl butyral based binder and an organic solvent such as ethanol was subjected to wet mixing in a ball mill to prepare a ceramic slurry.

The ceramic slurry was formed into the shape of a sheet by a doctor blade method to obtain ceramic green sheets.

A conductive paste containing Ni as its main constituent was printed onto the ceramic green sheets to form conductive paste films to serve as internal electrodes.

Then, multiple ceramic green sheets were stacked so as to alternate the sides to which the conductive paste films were extracted, thereby providing a raw capacitor main body.

Next, this raw capacitor main body was heated at a temperature of 350° C. in an $N_2$ atmosphere to burn off the binder, and then subjected to firing at the temperature shown in Table 1 for 2 hours in a reducing atmosphere composed of a $H_2$—$N_2$—$H_2O$ gas with an oxygen partial pressure of $10^{-10}$ to $10^{-12}$ MPa to achieve sintering of the capacitor main body.

Next, a silver paste containing $B_2O_3$—$SiO_2$—BaO based glass frit was applied to both end surfaces of the sintered capacitor main body, and fired at a temperature of 600° C. in an $N_2$ atmosphere to form external electrodes electrically connected to the internal electrodes, thereby providing laminated ceramic capacitors as samples.

The laminated ceramic capacitors thus obtained had outer dimensions of 1.0 mm in width, 2.0 mm in length, and 0.5 mm in thickness, and the dielectric ceramic layers interposed between the internal electrodes was 3 μm in thickness. In addition, the number of effective dielectric ceramic layers was 5, and the area of the internal electrode opposed per layer was $1.3 \times 10^{-6}$ $m^2$.

For the obtained laminated ceramic capacitors according to each sample, the electrostatic capacitance (C) and dielectric loss (tan δ) were measured by applying an alternating-current voltage of 1 $V_{rms}$ with 1 kHz at 25° C. with the use of an automatic bridge measuring instrument, and the relative permittivity (∈) was calculated from the obtained C, the area of the internal electrode, and the thickness of the dielectric ceramic layer.

In addition, the insulation resistance (R) was measured by applying a direct-current voltage of 15 kV/mm at 25° C. for 2 minutes with the use of an insulation resistance meter, and the insulation resistivity (ρ) was calculated on the basis of the obtained R and the structure of the laminated ceramic capacitor.

The results are shown in Table 1.

Sample 20 with a $SiO_2$ additive amount “e” of less than 0.01 failed to achieve any characteristics because of difficulty in sintering. In the case of sample 25 with a $SiO_2$ additive amount “e” of more than 0.04, the ∈ was less than 1000.

While the MnO additive amount “c” was 0.005 for all of the samples, it has been determined from Experimental Example 2 described below that undesirable results are produced in a high-temperature load reliability test if the MnO additive amount “c” is more than 0.01.

TABLE 1

| SAMPLE | $(1-x)(Ba_{1-y}Ca_y)TiO_3 + xCaTiO_3 + cMnO + eSiO_2$ | | | | Firing Temperature | log ρ | |
|---|---|---|---|---|---|---|---|
| NUMBER | x | y | c | e | (° C.) | (ρ: Ω · m) | ϵ |
| *1 | 0 | 0.11 | 0.005 | 0.025 | 1250 | 9.91 | 1508 |
| *2 | 0.0009 | 0.11 | 0.005 | 0.025 | 1250 | 9.91 | 1505 |
| 3 | 0.0010 | 0.11 | 0.005 | 0.025 | 1250 | 10.00 | 1501 |
| 4 | 0.003 | 0.11 | 0.005 | 0.025 | 1250 | 10.21 | 1488 |
| 5 | 0.005 | 0.11 | 0.005 | 0.025 | 1250 | 10.51 | 1481 |
| 6 | 0.008 | 0.11 | 0.005 | 0.025 | 1250 | 10.84 | 1452 |
| 7 | 0.015 | 0.11 | 0.005 | 0.025 | 1250 | 11.21 | 1301 |
| 8 | 0.018 | 0.11 | 0.005 | 0.025 | 1250 | 11.36 | 1109 |
| 9 | 0.020 | 0.11 | 0.005 | 0.025 | 1250 | 11.42 | 1029 |
| *10 | 0.021 | 0.11 | 0.005 | 0.025 | 1250 | 11.51 | 986 |
| *11 | 0.010 | 0.07 | 0.005 | 0.025 | 1250 | 9.66 | 1555 |
| 12 | 0.010 | 0.08 | 0.005 | 0.025 | 1250 | 10.52 | 1521 |
| 13 | 0.010 | 0.10 | 0.005 | 0.025 | 1250 | 10.94 | 1487 |
| 14 | 0.010 | 0.12 | 0.005 | 0.025 | 1250 | 10.83 | 1401 |
| 15 | 0.010 | 0.14 | 0.005 | 0.025 | 1250 | 10.80 | 1297 |
| 16 | 0.010 | 0.16 | 0.005 | 0.025 | 1250 | 10.71 | 1222 |
| 17 | 0.010 | 0.18 | 0.005 | 0.025 | 1250 | 10.63 | 1131 |
| 18 | 0.010 | 0.20 | 0.005 | 0.025 | 1250 | 10.51 | 1061 |
| *19 | 0.010 | 0.21 | 0.005 | 0.025 | 1250 | 10.36 | 978 |
| *20 | 0.010 | 0.11 | 0.005 | 0.009 | 1280 | Difficulty in Firing | |
| 21 | 0.010 | 0.11 | 0.005 | 0.010 | 1280 | 10.62 | 1499 |
| 22 | 0.010 | 0.11 | 0.005 | 0.020 | 1260 | 10.88 | 1454 |
| 23 | 0.010 | 0.11 | 0.005 | 0.030 | 1240 | 10.91 | 1386 |
| 24 | 0.010 | 0.11 | 0.005 | 0.040 | 1220 | 10.83 | 1213 |
| *25 | 0.010 | 0.11 | 0.005 | 0.050 | 1220 | 10.81 | 996 |

In Table 1, the sample numbers with a symbol of * correspond to samples outside the scope of this invention.

As shown in Table 1, samples 3 to 9, 12 to 18, and 21 to 24 within the scope of this invention satisfy the respective conditions of $0.001 \le x \le 0.02$, $0.08 \le y \le 0.20$, $0 \le c \le 0.01$, and $0.01 \le e \le 0.04$. These samples 3 to 9, 12 to 18, and 21 to 24 achieved an insulation resistivity of 10 or more in terms of log ρ (“Ω·m” for the unit of ρ), and ∈ of 1000 or more.

In contrast, the insulation resistivity was less than 10 in terms of log ρ in the case of samples 1 and 2 with the $CaTiO_3$ amount “x” less than 0.001. On the other hand, the ∈ was less than 1000 in the case of sample 10 with the $CaTiO_3$ amount “x” more than 0.02.

Figure 2:
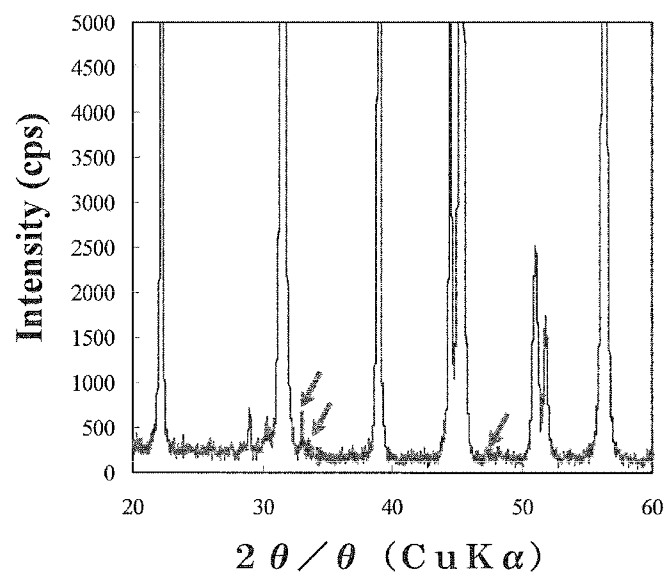
FIG. 2 is a diagram showing an XRD chart for a ceramic sintered body according to sample 14 prepared in Experimental Example 1.

FIG. 2 is a diagram showing an XRD chart for a ceramic sintered body according to sample 14 within the scope of this invention. In FIG. 2, the sections indicated by arrows refer to peaks for the $CaTiO_3$. Main large peaks all refer to peaks for $(Ba,Ca)TiO_3$. As described above, attention is paid in the XRD chart to the appearance of the peaks for the $CaTiO_3$ added in a minute amount.

In the case of sample 19 with a Ca substitution amount “y” more than 0.20, the insulation resistivity was less than 10 in terms of log ρ. On the other hand, the ∈ was less than 1000 in the case of sample 11 with a Ca substitution amount “y” less than 0.08.

EXPERIMENTAL EXAMPLE 2

$(Ba_{0.89}Ca_{0.11})_mTiO_3$ adjusted to the (Ba, Ca)/Ti ratio “m” shown in Table 2, $CaTiO_3$, $Y_2O_3$, $Gd_2O_3$, $Dy_2O_3$, $Ho_2O_3$, $Er_2O_3$, MgO, $V_2O_3$, and $SiO_2$ were prepared, and these materials were weighed so that “m”, “a”, “b”, “c”, “d”, and “e” achieved the numerical values shown in Table 2 in the composition formula of $(1-x)(Ba_{0.89}Ca_{0.11})_mTiO_3+xCaTiO_3+aRe_2O_3+bMgO+cMnO+dV_2O_3+eSiO_2$ to prepare a mixed raw material powder. In this case, “a”, “b”, “c”, “d” and “e” represent parts by mol with respect to 1 mol of $(1-x)(Ba_{0.89}Ca_{0.11})_mTiO_3+xCaTiO_3$.

Then, laminated ceramic capacitors samples were obtained in the same way as in the case of Experimental Example 1.

For laminated ceramic capacitors obtained according to each sample, the relative permittivity (∈) and insulation resistivity (ρ) were found in the same way as in the case of Experimental Example 1.

Furthermore, the electrostatic capacitance was measured while varying the temperature within the range from −55° C. to +150° C. in order to calculate the rate of change (“150° C. TCC”) in electrostatic capacitance with the maximum absolute value of change with the use of the electrostatic capacitance at 25° C. as a standard, and it was determined whether or not to satisfy the X8R characteristic of the EIA standard (“X8R determination”). The X8R determination is represented by the mark “○” in the case of succeeding in satisfying the X8R characteristic or the mark “x” in the case of failing to satisfy the X8R characteristic.

In addition, a direct-current voltage of 30 kV/mm was applied at a temperature of 175° C. to measure the change in insulation resistance with the passage of time as a high temperature load reliability test, and each sample was regarded as a failure when the insulation resistance value of the sample was decreased to $10^5$ Ω or less, to find the mean time to failure (MTTF) for each sample.

The results are shown in Table 2.

In addition, the 150° C. TCC exceeded ±15% in the case of sample 119 with a MgO additive amount “b” less than 0.005, resulting in a failure in the X8R determination. On the other hand, the MTTF was less than 20 hours in the case of sample 123 with a “b” more than 0.035.

In the case of sample 129 with the $V_2O_3$ additive amount “d” more than 0.01, the MTTF was less than 20 hours.

In the case of sample 130 with the MnO additive amount “c” more than 0.01, the MTTF was less than 20 hours.

TABLE 2

| SAMPLE NUMBER | $(1-x)(Ba_{1-y}Ca_y)_mTiO_3 + xCaTiO_3 + aRe_2O_3 + bMgO + cMnO + dV_2O_3 + eSiO_2$ | | | | | | | | | Firing Temperature | log ρ | | MTTF | 150° C. TCC | X8R Determination |
|---|---|---|---|---|---|---|---|---|---|---|---|---|---|---|---|
| | x | y | m | Re | a | b | c | d | e | (° C.) | (ρ: Ω · m) | ϵ | (hour) | (%) | |
| *101 | 0.010 | 0.11 | 0.98 | Y | 0.025 | 0.02 | 0.005 | 0.005 | 0.025 | 1200 | 10.51 | 1564 | 26 | 15.7 | x |
| 102 | 0.010 | 0.11 | 0.99 | Y | 0.025 | 0.02 | 0.005 | 0.005 | 0.025 | 1220 | 10.64 | 1512 | 31 | 14.6 | ○ |
| 103 | 0.010 | 0.11 | 1.00 | Y | 0.025 | 0.02 | 0 | 0.005 | 0.025 | 1220 | 10.84 | 1496 | 44 | 13.9 | ○ |
| 104 | 0.010 | 0.11 | 1.01 | Y | 0.025 | 0.02 | 0.01 | 0.005 | 0.025 | 1240 | 10.93 | 1451 | 52 | 12.9 | ○ |
| 105 | 0.010 | 0.11 | 1.03 | Y | 0.025 | 0.02 | 0.005 | 0.005 | 0.025 | 1250 | 10.82 | 1311 | 55 | 11.9 | ○ |
| 106 | 0.010 | 0.11 | 1.04 | Y | 0.025 | 0.02 | 0.005 | 0.005 | 0.025 | 1250 | 10.78 | 1263 | 50 | 11.7 | ○ |
| 107 | 0.010 | 0.11 | 1.05 | Y | 0.025 | 0.02 | 0.005 | 0.005 | 0.025 | 1260 | 10.62 | 1154 | 41 | 11.3 | ○ |
| *108 | 0.010 | 0.11 | 1.06 | Y | 0.025 | 0.02 | 0.005 | 0.005 | 0.025 | 1260 | 10.59 | 1060 | 19 | 10.6 | ○ |
| *109 | 0.010 | 0.11 | 1.02 | Y | 0.009 | 0.02 | 0.005 | 0.005 | 0.025 | 1200 | 10.85 | 1511 | 21 | 15.4 | x |
| 110 | 0.010 | 0.11 | 1.02 | Y | 0.010 | 0.02 | 0.005 | 0.005 | 0.025 | 1220 | 10.93 | 1501 | 31 | 14.8 | ○ |
| 111 | 0.010 | 0.11 | 1.02 | Y | 0.020 | 0.02 | 0.005 | 0.005 | 0.025 | 1240 | 10.94 | 1444 | 42 | 13.6 | ○ |
| 112 | 0.010 | 0.11 | 1.02 | Y | 0.030 | 0.02 | 0.005 | 0.005 | 0.025 | 1250 | 10.88 | 1289 | 61 | 11.9 | ○ |
| 113 | 0.010 | 0.11 | 1.02 | Y | 0.040 | 0.02 | 0.005 | 0.005 | 0.025 | 1250 | 10.82 | 1103 | 30 | 10.6 | ○ |
| *114 | 0.010 | 0.11 | 1.02 | Y | 0.050 | 0.02 | 0.005 | 0.005 | 0.025 | 1260 | 10.77 | 1001 | 18 | 9.8 | ○ |
| 115 | 0.010 | 0.11 | 1.02 | Gd | 0.025 | 0.02 | 0.005 | 0.005 | 0.025 | 1220 | 11.18 | 1536 | 33 | 14.9 | ○ |
| 116 | 0.010 | 0.11 | 1.02 | Dy | 0.025 | 0.02 | 0.005 | 0.005 | 0.025 | 1240 | 11.10 | 1501 | 40 | 13.6 | ○ |
| 117 | 0.010 | 0.11 | 1.02 | Ho | 0.025 | 0.02 | 0.005 | 0.005 | 0.025 | 1260 | 11.02 | 1411 | 46 | 13.1 | ○ |
| 118 | 0.010 | 0.11 | 1.02 | Er | 0.025 | 0.02 | 0.005 | 0.005 | 0.025 | 1260 | 10.63 | 1325 | 51 | 11.6 | ○ |
| *119 | 0.010 | 0.11 | 1.02 | Y | 0.025 | 0.004 | 0.005 | 0.005 | 0.025 | 1250 | 10.84 | 1586 | 36 | 15.6 | x |
| 120 | 0.010 | 0.11 | 1.02 | Y | 0.025 | 0.005 | 0.005 | 0.005 | 0.025 | 1250 | 10.92 | 1512 | 44 | 14.3 | ○ |
| 121 | 0.010 | 0.11 | 1.02 | Y | 0.025 | 0.01 | 0.005 | 0.005 | 0.025 | 1250 | 10.91 | 1462 | 51 | 13.8 | ○ |
| 122 | 0.010 | 0.11 | 1.02 | Y | 0.025 | 0.03 | 0.005 | 0.005 | 0.025 | 1250 | 10.96 | 1198 | 36 | 11.9 | ○ |
| *123 | 0.010 | 0.11 | 1.02 | Y | 0.025 | 0.04 | 0.005 | 0.005 | 0.025 | 1250 | 10.91 | 1050 | 16 | 10.6 | ○ |
| 124 | 0.010 | 0.11 | 1.02 | Y | 0.025 | 0.02 | 0.005 | 0.000 | 0.025 | 1250 | 10.77 | 1489 | 31 | 14.1 | ○ |
| 125 | 0.010 | 0.11 | 1.02 | Y | 0.025 | 0.02 | 0.005 | 0.002 | 0.025 | 1250 | 10.81 | 1441 | 36 | 13.6 | ○ |
| 126 | 0.010 | 0.11 | 1.02 | Y | 0.025 | 0.02 | 0.005 | 0.004 | 0.025 | 1250 | 10.84 | 1405 | 50 | 12.6 | ○ |
| 127 | 0.010 | 0.11 | 1.02 | Y | 0.025 | 0.02 | 0.005 | 0.008 | 0.025 | 1250 | 10.56 | 1331 | 68 | 11.3 | ○ |
| 128 | 0.010 | 0.11 | 1.02 | Y | 0.025 | 0.02 | 0.005 | 0.010 | 0.025 | 1250 | 10.21 | 1235 | 32 | 10.1 | ○ |
| *129 | 0.010 | 0.11 | 1.02 | Y | 0.025 | 0.02 | 0.005 | 0.011 | 0.025 | 1250 | 10.01 | 1186 | 18 | 9.4 | ○ |
| *130 | 0.010 | 0.11 | 1.02 | Y | 0.025 | 0.02 | 0.011 | 0.005 | 0.025 | 1250 | 11.01 | 1420 | 18 | 12.1 | ○ |

In Table 2, the sample numbers with a symbol of * correspond to samples outside the scope of this invention.

As shown in Table 2, samples 102 to 107, 110 to 113, 115 to 118, 120 to 122, and 124 to 128 (within the scope of this invention) satisfy the respective conditions of $0.001 \le x \le 0.02$, $0.08 \le y \le 0.20$, $0.99 \le m 1.05$, $0.01 \le a \le 0.04$, $0.005 \le b\ 0.035$, $0 \le c \le 0.01$, $0 \le d \le 0.01$, and $0.01 \le e \le 0.04$. Samples 102 to 107, 110 to 113, 115 to 118, 120 to 122, and 124 to 128 achieved an insulation resistivity of 10 or more in terms of log ρ (“Ω·m” being the unit of ρ), an ∈ of 1000 or more, a MTTF of 20 hours or more, and a 150° C. TCC within ±15%, resulting in a pass in the X8R determination.

In contrast, sample 101 with a (Ba,Ca)/Ti ratio “m” less than 0.99, had a 150° C. TCC exceeding ±15%, resulting in a failure in the X8R determination. Also, sample 108 with the “m” more than 1.05, had a MTTF of less than 20 hours.

In case of sample 109 with the $Re_2O_3$ (Re being Gd, Dy, Y, Ho, or Er) additive amount “a” being less than 0.01, the 150° C. TCC exceeded ±15%, resulting in a failure in the X8R determination. In the case of sample 114 with the “a” more than 0.04, the MTTF was less than 20 hours.

DESCRIPTION OF REFERENCE SYMBOLS

1 laminated ceramic capacitor
2 capacitor main body
3 dielectric ceramic layer
4, 5 internal electrode
8, 9 external electrode

The invention claimed is:

1. A dielectric ceramic having a composition represented by the composition formula:

$$(1-x)(Ba_{1-y}Ca_y)TiO_3+xCaTiO_3+eSiO_2,$$

wherein $0.001 \le x \le 0.02$ $0.08 \le y \le 0.20$, and $0.01 \le e \le 0.04$ where e is expressed in terms of parts by mol with respect to 1 mol of $(1-x)(Ba_{1-y}Ca_y)TiO_3+xCaTiO_3$.

2. The dielectric ceramic according to claim 1, wherein $0.003 \le x \le 0.018$ $0.08 \le y \le 0.18$, and $0.02 \le e \le 0.03$.

3. A dielectric ceramic having a composition represented by the composition formula:

$$(1-x)(Ba_{1-y}Ca_y)_mTiO_3+xCaTiO_3+aRe_2O_3+bMgO+cMnO+dV_2O_3+eSiO_2$$

$0.08 \leq y \leq 0.20$, $0.99 \leq m \leq 1.05$, $0.01 \leq a \leq 0.04$, $0.005 \leq b \leq 0.035$, wherein Re is at least one member selected from the group consisting of Gd, Dy, Y, Ho, and Er, $0.001 \leq x \leq 0.02$, $0 \leq c \leq 0.01$, $0 \leq d \leq 0.01$, and $0.01 \leq e \leq 0.04$ in which a, b, c, d, and e are each expressed in terms of parts by mol with respect to 1 mol of $(1-x)\ (Ba_{1-y}Ca_y)_mTiO_3+xCaTiO_3$.

4. The dielectric ceramic according to claim 3, wherein $0.003 \leq x \leq 0.018$ $0.08 \leq y \leq 0.18$, and $0.02 \leq e \leq 0.03$.

5. The dielectric ceramic according to claim 4, wherein $a \leq 0.025$, $b \leq 0.030$, $0 \leq c$, and $0 \leq d$.

6. The dielectric ceramic according to claim 5, wherein Re is Y.

7. The dielectric ceramic according to claim 3, wherein $a \leq 0.025$, $b \leq 0.030$, $0 < c$, and $0 < d$.

8. The dielectric ceramic according to claim 3, wherein Re is Y.

9. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 8.

10. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 7.

11. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 6.

12. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 5.

13. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 4.

14. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 3.

15. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 2.

16. A laminated ceramic capacitor comprising:

a capacitor main body comprising a plurality of stacked dielectric ceramic layers, and a plurality of internal electrodes disposed at different interfaces between the dielectric ceramic layers; and a plurality of external electrodes dispose at different positions from each other on an outer surface of the capacitor main body and electrically connected to the internal electrodes, wherein the dielectric ceramic layers comprise the dielectric ceramic according to claim 1.

* * * * *